United States Patent
Yun et al.

(10) Patent No.: US 9,446,769 B2
(45) Date of Patent: Sep. 20, 2016

(54) SYSTEM FOR PROVIDING FUEL EFFICIENCY INFORMATION OF CONSTRUCTION MACHINERY

(71) Applicant: DOOSAN INFRACORE CO., LTD., Incheon (KR)

(72) Inventors: Hong Cheol Yun, Gyeonggi-do (KR); Duck Woo Park, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 14/372,839

(22) PCT Filed: Jan. 24, 2013

(86) PCT No.: PCT/KR2013/000547
§ 371 (c)(1),
(2) Date: Jul. 17, 2014

(87) PCT Pub. No.: WO2013/115520
PCT Pub. Date: Aug. 8, 2013

(65) Prior Publication Data
US 2014/0336916 A1    Nov. 13, 2014

(30) Foreign Application Priority Data
Jan. 30, 2012 (KR) ........................ 10-2012-0008762

(51) Int. Cl.
B60W 40/12 (2012.01)
E02F 9/26 (2006.01)
B60W 50/14 (2012.01)

(52) U.S. Cl.
CPC ........ *B60W 40/12* (2013.01); *B60W 2050/146* (2013.01); *B60W 2510/0638* (2013.01); *B60W 2540/30* (2013.01); *B60W 2560/04* (2013.01); *E02F 9/267* (2013.01)

(58) Field of Classification Search
CPC .............. B60W 2040/0827; B60W 2050/146; B60W 2050/143; B60W 2420/42; B60W 2510/18; B60W 2510/244; B60W 2520/00
See application file for complete search history.

(56) References Cited

U.S. PATENT DOCUMENTS 7,483,814 B2 *  1/2009  Hoshi et al. .................. 702/182

FOREIGN PATENT DOCUMENTS

CN         1846048 A        10/2006
JP        2005-098073        4/2005
(Continued)

OTHER PUBLICATIONS

Chinese Office Action mailed Jul. 31, 2015 for Chinese Application No. 201380006914.2, 6 pages.
(Continued)

*Primary Examiner* — Mussa A Shaawat
*Assistant Examiner* — Abdhesh Jha
(74) *Attorney, Agent, or Firm* — John D. Veldhuis-Kroeze; Westman, Champlin & Koehler, P.A.

(57) ABSTRACT

According to the present disclosure, there is provided a system for providing information about fuel efficiency of construction machinery, including: a TMS controller obtaining information about reference fuel efficiency through a communication network from a server, and providing the information about the reference fuel efficiency as display information; and an equipment controller calculating information about current fuel efficiency by analyzing operations of constituent elements of the construction machinery.

5 Claims, 3 Drawing Sheets

(56) References Cited

FOREIGN PATENT DOCUMENTS

| JP | 2005-098988 | | 4/2005 | |
| JP | 2005098988 | * | 4/2005 | ............. B60K 35/00 |
| JP | 2008-217559 | | 9/2008 | |
| JP | 2008217559 | * | 9/2008 | ........... G06Q 10/100 |
| KR | 10-2011-0073705 | | 6/2011 | |
| WO | 01-73221 | | 10/2001 | |

OTHER PUBLICATIONS

Search Report dated Apr. 16, 2013 and written in Korean with English translation for International Patent Application No. PCT/KR2013/000547 filed Jan. 24, 2013, 5 pages.

* cited by examiner

| TYPE A | TYPE B | TYPE C | · · · |

| | |
|---|---|
| BEST FUEL EFFICIENCY EQUIPMENT FOR EACH OPERATION PLACE CONDITION | XXXX |
| BEST FUEL EFFICIENCY EQUIPMENT FOR EACH OPERATION PLACE LOAD | AXXX |
| BEST FUEL EFFICIENCY EQUIPMENT FOR EACH OPERATION MODE | BXXX |
| · · · | · · · |

FIG. 4

BEST FUEL EFFICIENCY EQUIPMENT FOR EACH OPERATION MODE (XXXB) (STANDARD MODE)

| | |
|---|---|
| REVOLUTIONS PER MINUTE OF ENGINE | XX rpm |
| DISCHARGED FLOW RATE | XX l/m |
| HORSEPOWER | XX HP |
| DRIVING SPEED | XX m/sec |
| USE TIME WITH NO LOAD | XX h |
| · · · | · · · |

FIG. 5

SYSTEM FOR PROVIDING FUEL EFFICIENCY INFORMATION OF CONSTRUCTION MACHINERY

CROSS-REFERENCE TO RELATED APPLICATION

This Application is a Section 371 National Stage Application of International Application No. PCT/KR2013/000547, filed Jan. 24, 2013 and published, not in English, as WO 2013/115520 on Aug. 8, 2013.

FIELD OF THE DISCLOSURE

The present disclosure relates to a system for providing information about fuel efficiency of construction machinery, and more particularly, to a system for providing information about fuel efficiency of construction machinery, which enables an operator to recognize fuel efficiency for a current operation by comparing and displaying optimum reference fuel efficiency and actual current fuel efficiency according to the current operation of the construction machinery while the construction machinery operates and is driven.

BACKGROUND OF THE DISCLOSURE

Construction machinery, such as an excavator, generally has a large difference in fuel efficiency according to an operation pattern, such as a manipulation habit of an operator. Especially, the construction machinery performs an operation over a long period of time, and the amount of fuel consumed of an engine is large, so that even though the same operation is performed by using the construction machinery, a difference in the amount of fuel consumed is considerably generated for each operator.

As described above, the construction machinery incurs a large difference in the amount of fuel consumed depending on the manipulation habit, so that the operator needs to operate the construction machinery with an efficiency operation pattern.

However, since it is impossible to recognize the amount of optimum fuel consumption in a current operation state, as well as the amount of current fuel consumption, it is impossible to change the operation pattern of the operator.

In the meantime, a remote control method enabling the construction machinery to be manlessly operated by transmitting data between a remote server and the construction machinery by using a tele management system (TMS) method has been recently on the rise.

Accordingly, a method enabling an operator to perform an operation with the amount of optimum fuel consumption by using the TMS method is necessary.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An object of the present disclosure is to provide a system for providing information about fuel efficiency of construction machinery, which is capable of inducing a manipulation corresponding to the amount of optimum fuel consumption by using a TMS method.

Another object of the present disclosure is to provide a system for providing information about fuel efficiency of construction machinery, which shares information about fuel efficiency with a plurality of operators by using a TMS method.

Yet another object of the present disclosure is to provide a system for providing information about fuel efficiency of construction machinery, which enables an operator to conveniently learn an operating habit of the operator himself/herself.

In order to achieve the above objects, an exemplary embodiment of the present disclosure provides a system for providing information about fuel efficiency of construction machinery, comprising: a TMS controller obtaining information about reference fuel efficiency through a communication network from a server, and providing the information about the reference fuel efficiency as display information; and an equipment controller calculating information about current fuel efficiency by analyzing operations of constituent elements of the construction machinery.

The TMS controller may provide the information about the current fuel efficiency to the server.

The equipment controller may display the information about the current fuel efficiency calculated by analyzing operations of constituent elements of the construction machinery and the information about the reference fuel efficiency obtained from the TMS controller together on a gauge.

The equipment controller may display information about optimum reference fuel efficiency on a first area of the gauge, display the information about the current fuel efficiency on a second area, and display information about a total fuel consumption ratio, which represents a ratio of the amount of fuel consumed by the current fuel efficiency to the amount of fuel consumed by the reference fuel efficiency for a predetermined time, on a third area.

The equipment controller may display variances of the information about the reference fuel efficiency and the information about the current fuel efficiency according to a time in a graph form.

The information about the reference fuel efficiency may include a plurality of tables and records and fields of the respective tables, and the plurality of tables may be configured for each type of construction machinery.

The record and the field of the table may include at least one of best fuel efficiency equipment for each operation place condition, best fuel efficiency equipment for each operation load, best fuel efficiency equipment for each operation mode, daily best fuel efficiency equipment, weekly best fuel efficiency equipment, monthly best fuel efficiency equipment, annually best fuel efficiency equipment, and the like.

The record and the field of the table may include at least one of revolutions per minute of an engine, a discharged flow rate, horsepower, a driving speed, and a use time with no load.

The information about the current fuel efficiency may be transmitted to the server, compared with the information about the reference fuel efficiency, and calculated as fuel efficiency learning information to be provided to an operator through a personal terminal.

According to the present disclosure, it is possible to induce a manipulation corresponding to the amount of optimum fuel consumption by providing the information about the optimum reference fuel efficiency of the construction machinery from the server to the construction machinery by using the TMS method, comparing and analyzing the information about the optimum reference fuel efficiency and the information about the actual current fuel efficiency of the corresponding operation, and displaying the compared and analyzed information to the operator.

Further, it is possible to generate information about more realistic reference fuel efficiency by providing the information about the current fuel efficiency of the corresponding construction machinery to the server by using the TMS method and then utilizing the provided information about the current fuel efficiency as the information about the optimum reference fuel efficiency.

Further, it is possible to teach an operator so as to have an operating habit improving fuel efficiency through a personal terminal, such as a PC and a portable terminal by displaying the fuel efficiency learning information obtained by comparing and analyzing the information about the optimum reference fuel efficiency and the information on the actual current fuel efficiency by the server on a web page.

According to a method of displaying fuel efficiency of construction machinery, a fuel efficiency improvement rate of hybrid construction machinery corresponding to the fuel efficiency of hydraulic construction machinery is displayed on a monitor as a fuel efficiency index, so that a user is capable of learning an operative manipulation method having efficient fuel efficiency by determining total power consumed according to an operation, an assistant rate of a battery, and the fuel efficiency index.

DESCRIPTION OF THE DRAWINGS

FIGS. 4 and 5 are diagrams illustrating an exemplary embodiment of a table of information about optimum reference fuel efficiency in the system for providing information about fuel efficiency of the construction machinery of FIG. 1, respectively.

DETAILED DESCRIPTION

The aforementioned objects, characteristics, and advantages will be described in detail below with reference to the accompanying drawings, and thus those skilled in the art to which the present disclosure pertains will easily implement the technical spirit of the present disclosure. In the following description, a detailed explanation of known related functions and constitutions may be omitted so as to avoid unnecessarily obscuring the subject matter of the present disclosure. Hereinafter, an exemplary embodiment according to the present disclosure will be described with reference to the accompanying drawings in detail.

Figure 1:
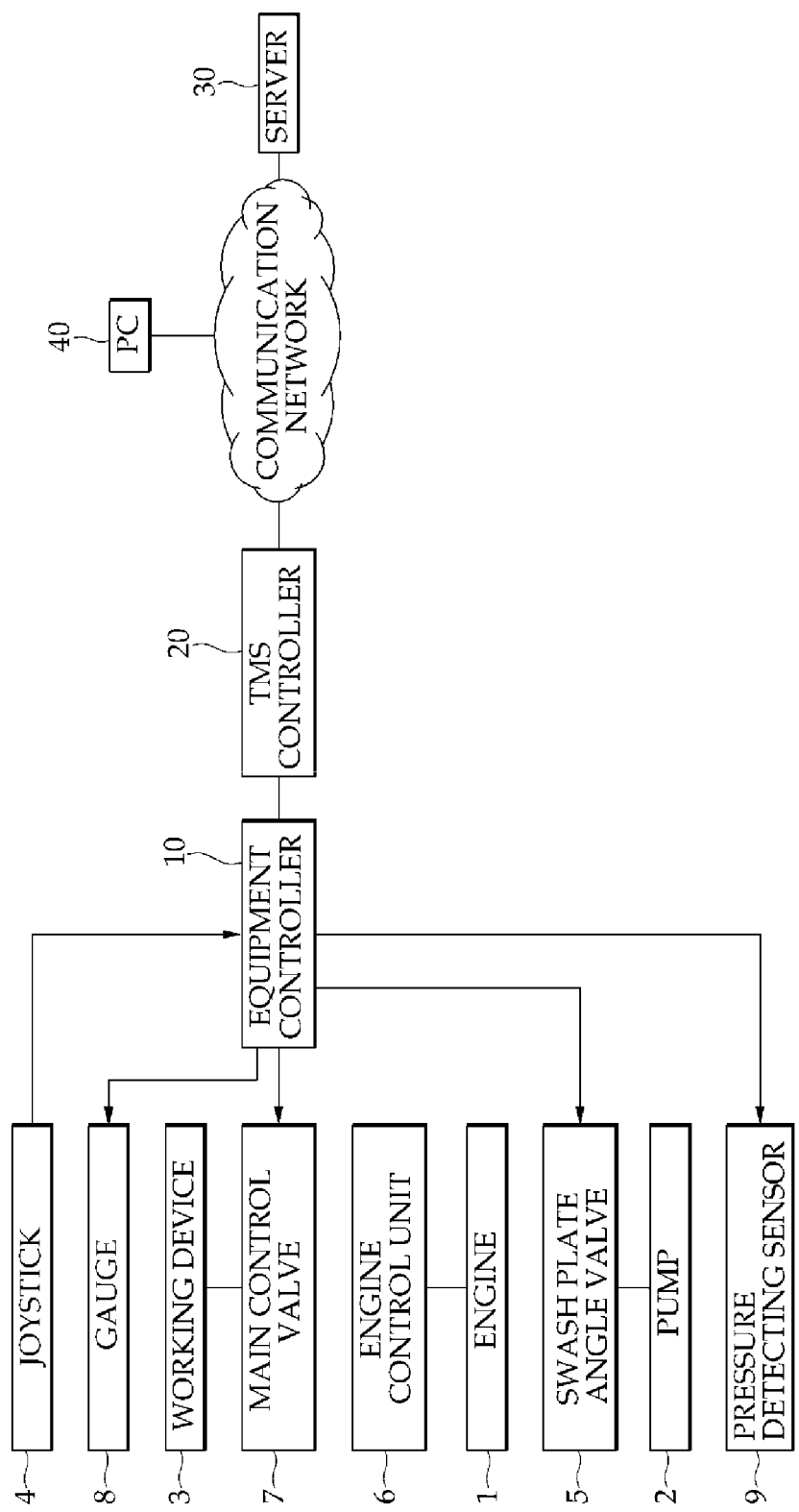
FIG. 1 is a diagram schematically illustrating a configuration of a system for providing information about fuel efficiency of construction machinery according to an exemplary embodiment of the present disclosure.
Figure 2:
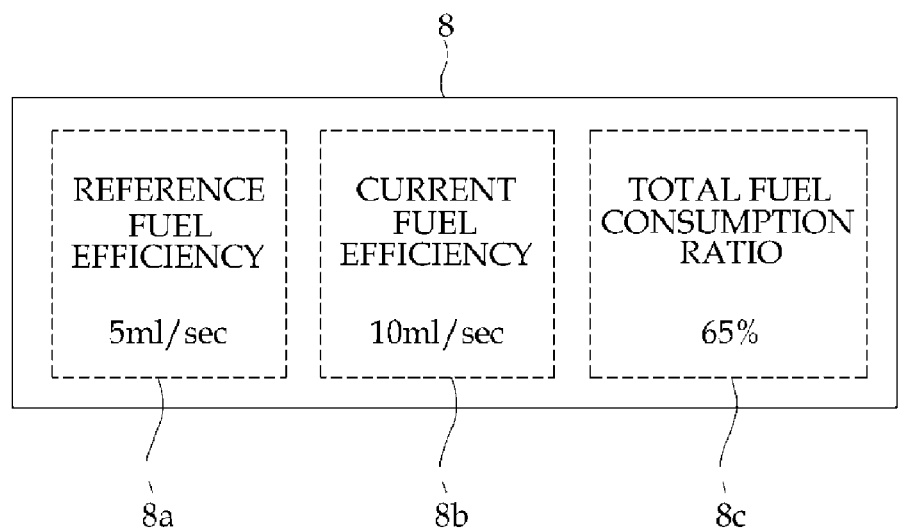
FIGS. 2 and 3 are diagrams illustrating an exemplary embodiment of information about the optimum reference fuel efficiency and information about current fuel efficiency displayed on a gauge of the construction machinery in the system for providing information about fuel efficiency of the construction machinery of FIG. 1, respectively.
Figure 3:
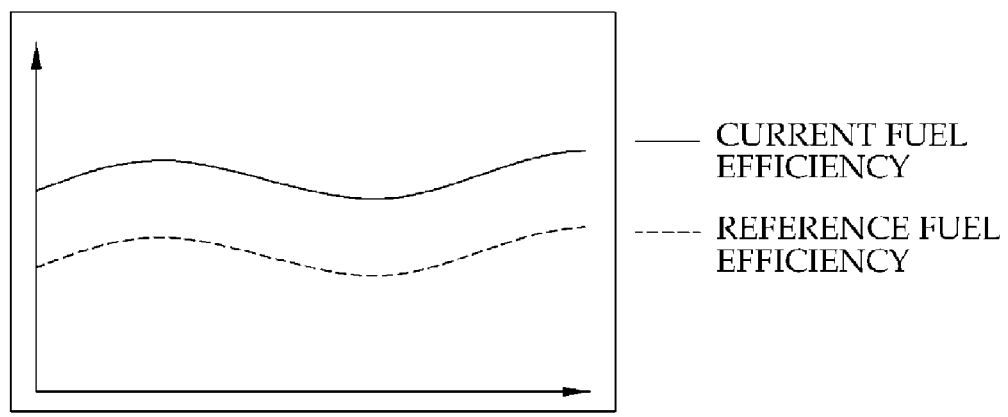

FIG. 1 is a diagram schematically illustrating a configuration of a system for providing information about fuel efficiency of construction machinery according to an exemplary embodiment of the present disclosure, FIGS. 2 and 3 are diagrams illustrating an exemplary embodiment of information about the optimum reference fuel efficiency and information about current fuel efficiency displayed on a gauge of the construction machinery in the system for providing information about fuel efficiency of the construction machinery of FIG. 1, respectively, and FIGS. 4 and 5 are diagrams illustrating an exemplary embodiment of a table of information about optimum reference fuel efficiency in the system for providing information about fuel efficiency of the construction machinery of FIG. 1, respectively.

As illustrated in FIGS. 1 to 5, the system for providing information about fuel efficiency of the construction machinery according to the exemplary embodiment of the present disclosure, which is applied to construction machinery driving a working device 3 with hydraulic oil discharged from a hydraulic pump 2 directly connected with an engine 1, includes a joystick 4 for generating a manipulation signal for driving the working device 3, the engine 1 driven so that the hydraulic oil corresponding to the manipulation signal is output from the hydraulic pump 2, a swash plate angle valve 5 for controlling a flow rate of the hydraulic oil output from the hydraulic pump 2, an engine control unit 6 for controlling driving of the engine 1, a main control valve 7 for outputting the hydraulic oil of the hydraulic pump 2 to the working device 3, a gauge 8 for displaying corresponding information necessary for an operation of the construction machinery, a pressure detecting sensor 9 for detecting a load pressure generated by the working device 3, an equipment controller 10 for calculating information about current fuel efficiency of a corresponding operation by controlling the operations of the constituent elements 4 to 9, displaying the calculated information about the current fuel efficiency on the gauge 8 together with information about optimum reference fuel efficiency, and inducing a manipulation of the operator corresponding to the information about the optimum reference fuel efficiency, and a TMS controller 20 for enabling the information about the optimum reference fuel efficiency of the corresponding operation to be provided from a server 30 connected through a communication network to the equipment controller 10 or the information about the current fuel efficiency to be provided to the server 30.

Further, an optimum fuel efficiency comparison system of the construction machinery may further include a personal computer (PC) 40 connected to the server 30 through the communication network to enable the operator to learn an operating habit, and the like of the operator himself/herself based on the information about the current fuel efficiency calculated by the equipment controller 10 and the information about the optimum reference fuel efficiency.

A plurality of hydraulic pumps 2 driven by the engine 1 may be provided, and revolutions per minute of the engine and a flow rate of discharged hydraulic oil are detected by the engine control unit 6 and the swash plate angle valve 5, respectively, to be provided to the equipment controller 10.

Further, when the manipulation signal for driving the working device 3, such as a bucket, an arm, and a boom, is generated by the joystick 4, the equipment controller 10 outputs a flow rate control signal corresponding to the manipulation signal to the main control valve 7 to control a corresponding operation of the working device 3.

Further, as illustrated in FIG. 2, the gauge 8 may be divided into a first area 8a on which information about optimum reference fuel efficiency of the corresponding operation provided from the TMS controller 20 to be described below is displayed, a second area 8b on which information about current fuel efficiency of a corresponding operation calculated by the equipment controller 10 is displayed, and a third area 8c on which information about a total fuel consumption ratio, which represents a ratio of the amount of fuel consumed by the current fuel efficiency to the amount of fuel consumed by the reference fuel efficiency for a predetermined time with a percentage, is displayed, and further, as illustrated in FIG. 3, may also display variances of the information about the reference fuel efficiency and the information about the current fuel efficiency according to a time in a graph form. Here, the information about the total fuel consumption ratio may be calculated by the equipment controller 10.

The load pressure sensor 9 is positioned on the working device, that is, an actuator, such as the bucket, the arm, and the boom, to detect a load pressure, a necessary flow rate, and the like for each posture of the working device 3 and provide the detected load pressure, necessary flow rate, and the like to the equipment controller 10.

The equipment controller 10 calculates the information about the current fuel efficiency of the corresponding work by controlling the operations of the joystick 4, the swash plate angle valve 5, the engine control unit 6, the main control valve 7, the gauge 8, and the load pressure sensor 9, displays the calculated information about the current fuel efficiency together with the information about the optimum reference fuel efficiency of the corresponding operation on the gauge 8, and induces a manipulation of the construction machinery of the operator corresponding to the information about the optimum reference fuel efficiency, and as the information about the current fuel efficiency of the corresponding operation, revolutions per minute of the engine, the discharged flow rate, horsepower, a driving speed, and a use time with no load may be calculated based on various information, such as the revolutions per minute of the engine 1 transmitted from the engine control unit 6, a discharged flow rate of the hydraulic pump 2 transmitted from the swash plate angle valve 5, a load pressure generated by the working device 3, and a current value of the manipulation signal generated by the joystick 4 according to a corresponding operation mode.

In the meantime, the equipment controller 10 receives the information about the optimum reference fuel efficiency from the TMS controller 20 to be described below, but may also generate information about reference fuel efficiency by an autonomously stored reference fuel efficiency generating algorithm.

Here, the reference fuel efficiency generating algorithm may generate information, such as revolutions per minute of the engine, the amount of discharged hydraulic oil, a reference driving speed, and the reference fuel efficiency corresponding thereto through a manipulation signal in the current operation state, information about a posture of the working device 3, and a load of the working device 3, and a detailed description thereof is disclosed in Korean Patent Application Publication No. 10-2011-73705, and thus will be omitted.

The TMS controller 20 enables the information about the optimum reference fuel efficiency to be provided from the server 30 connected through the communication network to the equipment controller 10 or the information about the current fuel efficiency calculated by the equipment controller 10 to be provided to the server 30, and permits the information about the optimum reference fuel efficiency and the information about the current fuel efficiency to be shared with the operator and other operators through the server 30 and allows the operator to identify the information about the reference fuel efficiency of the construction machinery under a desired condition, thereby improving an operating habit of the operator to an operating habit having high fuel efficiency.

Here, the server 30 is connected to the TMS controller 20 through the communication network to calculate the information about the optimum reference fuel efficiency by comparing information about the current fuel efficiency corresponding to the corresponding operations calculated and provided from a plurality of construction machinery, and the information about the optimum reference fuel efficiency consists of a plurality of tables, and records and fields of the respective tables.

In this case, the plurality of tables of the information about the reference fuel efficiency is configured for each type of construction machinery, and the record and the field of the table may include best fuel efficiency equipment for each operation place condition, best fuel efficiency equipment for each operation load, best fuel efficiency equipment for each operation mode, daily best fuel efficiency equipment, weekly best fuel efficiency equipment, monthly best fuel efficiency equipment, annually best fuel efficiency equipment, and the like.

Further, the record and the field of the table may become another separate table, and in this case, the record and the field may include revolutions per minute of the engine, the discharged flow rate, horsepower, a driving speed, and a use time with no load.

That is, according to the information about the reference fuel efficiency, for example, the operator may perform the corresponding operation while directly identifying data, such as revolutions per minute of the engine, the discharged flow rate, horsepower, a driving speed, a use time with no load, of the best fuel efficiency equipment for each operation mode in the specific type of construction machinery, thereby forming an operating habit with high fuel efficiency.

Further, the server 30 compares the information about the current fuel efficiency of each construction machinery based on the information about the reference fuel efficiency, calculates the compared information about the current fuel efficiency as fuel efficiency learning information, and provides the calculated fuel efficiency learning information to a web page, thereby inducing the operator connected with the server 30 through the PC 40 to perform a manipulation corresponding to the amount of optimum fuel consumption based on the fuel efficiency learning information.

In this case, the fuel efficiency learning information is compared and calculated based on the information about the current fuel efficiency of the equipment currently used by the operator and information about the reference fuel efficiency of the best fuel efficiency equipment among equipment corresponding to the information about the current fuel efficiency, that is, equipment having the most similar operation load to that of the equipment currently used by the operator, and may include, for example, information about reference fuel efficiency, current fuel efficiency, and a total fuel consumption ratio for the current equipment, reference fuel efficiency, current fuel efficiency, and a total fuel consumption ratio for the best fuel efficiency equipment among equipment having the most similar operation load, a difference in the two items between the best fuel efficiency equipment and the current equipment, an operation mode use rate for the best fuel efficiency equipment, a use rate of revolutions per minute of the engine of the best fuel efficiency equipment and a difference in use rates of revolutions per minute of the engines between the best fuel efficiency equipment and the current equipment, fuel efficiency per operation hour of the best fuel efficiency equipment and a difference in the fuel efficiency per operation hour between the best fuel efficiency equipment and the current equipment, a use time with no load of the best fuel efficiency equipment and a difference in the use time with no load between the best fuel efficiency equipment and the current equipment, a recommended operation mode through an analysis of corresponding information, revolutions per minute of the engine, and a use time with no load required to be decreased.

In the meantime, in the present disclosure, in a case where a request signal for the information about the reference fuel efficiency is generated by the operator through the gauge 8, the information about the reference fuel efficiency may be displayed on the gauge 8 by a method in which the TMS controller 20 receives the information about the reference fuel efficiency by making a request for the information about the reference fuel efficiency to the server 30, and then provides the received information about the reference fuel efficiency to the equipment controller 10 again, and in this case, the equipment controller 10 may display the reference fuel efficiency, the current fuel efficiency, the total fuel consumption ratio of the best fuel efficiency equipment among the equipment having the most similar operation load to that of the current equipment on the gauge 8, or may further display a mode for scanning and revolutions per minute of the engine for scanning of the best fuel efficiency equipment.

Hereinafter, an action and an effect of the system for providing information about fuel efficiency of the construction machinery according to the exemplary embodiment of the present disclosure will be described.

In the system for providing information about fuel efficiency of the construction machinery according to the exemplary embodiment of the present disclosure, a reference fuel efficiency information request signal is first provided to the TMS controller 20 from the equipment controller 10, and subsequently, the TMS controller 20 receives information about the reference fuel efficiency from the server 30 through the communication network and transmits the received information about the reference fuel efficiency to the equipment controller 10.

In this case, the server 30 compares information on current fuel efficiency corresponding to corresponding operations calculated and provided from a plurality of construction machinery, generates information about optimum reference fuel efficiency, and establishes the generated information about the optimum reference fuel efficiency as a database, and the reference fuel efficiency information request signal includes data for a corresponding table selected by the operator among the information about the optimum reference fuel efficiency.

Then, the equipment controller 10 displays the information about the optimum reference fuel efficiency and information on actual current fuel efficiency for a corresponding operation of a currently operated construction machinery in real time, and simultaneously displays the ratio of the amount of current fuel consumption to the amount of reference fuel consumption based on the information about the reference fuel efficiency and the information about the current fuel efficiency as information about the total fuel consumption ratio on the gauge 8.

Accordingly, the manipulation habit of the operator is improved to correspond to the information about the reference fuel efficiency when manipulating the currently operated construction machinery, thereby improving fuel efficiency.

Further, the equipment controller 10 makes the calculated information about the current fuel efficiency be provided to the server 30 from the TMS controller 20 during the operation or after the completion of the operation, so that the server 30 compares the information about the current fuel efficiency with information about current fuel efficiency of another construction machinery and analyzes the information to generate the information about the optimum reference fuel efficiency.

Here, the server 30 compares the information about the current fuel efficiency of each construction machinery based on the information about the reference fuel efficiency, calculates the compared information about the current fuel efficiency as fuel efficiency learning information, and provides the calculated fuel efficiency learning information to a web page, thereby inducing the operator connected with the server 30 through a personal terminal 40, such as a PC, a portable terminal, and the like to perform a manipulation corresponding to the amount of optimum fuel consumption based on the fuel efficiency learning information.

Accordingly, the system for providing the information about the fuel efficiency of the construction machinery provides the information about the optimum reference fuel efficiency of the construction machinery from the server to the construction machinery by using the TMS method, compares and analyzes the information about the optimum reference fuel efficiency and the information about the actual current fuel efficiency of the corresponding operation, and displays the compared and analyzed information to the operator, thereby inducing a manipulation corresponding to the amount of optimum fuel consumption.

Further, the information about the current fuel efficiency of the corresponding construction machinery is provided to the server by using the TMS method and then is utilized as the information about the optimum reference fuel efficiency, so that it is possible to generate information about more realistic reference fuel efficiency.

Further, the fuel efficiency learning information obtained by comparing and analyzing the information about the optimum reference fuel efficiency and the information about the actual current fuel efficiency by the server is displayed on the web page, so that the operator may learn from the provided data in order to have an operating habit improving fuel efficiency through a personal terminal, such as a PC and a portable terminal.

It should be noted that the technical spirit of the present disclosure has been described according to the exemplary embodiment in detail, but the exemplary embodiment has been described herein for purposes of illustration and does not limit the present disclosure. Further, those skilled in the art will appreciate that various modifications may be made without departing from the scope and spirit of the present disclosure.

The invention claimed is:

1. A system for providing information about fuel efficiency of construction machinery and driving the construction machinery accordingly, comprising:
  a hydraulic pump;
  a tele management system (TMS) controller configured to obtain information about reference fuel efficiency through a communication network from a server; and provide the information about the reference fuel efficiency as display information; and
  an equipment controller configured to:
    calculate information about current fuel efficiency by analyzing operations of constituent elements of the construction machinery, wherein the information about the reference fuel efficiency includes a plurality of tables and records and fields of the respective tables, wherein the plurality of tables is configured for each type of construction machinery, and the records and the fields of the tables include at least one of best fuel efficiency equipment for each operation place condition, daily best fuel efficiency equipment, weekly best fuel efficiency equipment, monthly best fuel efficiency equipment, and annually best fuel efficiency equipment, wherein the records and the fields of the tables include at least one of revolutions per minute of an engine, a discharged flow rate, horsepower, a driving speed, and a use time with no load, wherein the information about the current fuel efficiency is transmitted to the server, and compared with the information about the reference fuel efficiency, wherein the compared information is calculated as fuel efficiency learning information to be provided to an operator through a personal terminal, and wherein the fuel efficiency learning information includes a use time with no load of the best fuel efficiency equipment, a difference in the use time with no load between the best fuel efficiency equipment and current equipment, a recommended operation mode through an analysis of corresponding information, revolutions per minute of the engine, and a use time with no load required to be decreased;

display the information about the current fuel efficiency calculated by analyzing operations of constituent elements of the construction machinery and the information about the reference fuel efficiency obtained from the TMS controller together on a gauge;

display variances of the information about the reference fuel efficiency and the information about the current fuel efficiency according to a time in a graph form on the gauge; and induce generation of a manipulation signal that drives a working device of the construction machinery according to the fuel efficiency learning information, wherein hydraulic oil is outputted from the hydraulic pump to the working device according to the manipulation signal.

2. The system of claim 1, wherein the TMS controller is configured to provide the information about the current fuel efficiency to the server.

3. The system of claim 1, wherein the equipment controller is configured to:

display information about optimum reference fuel efficiency on a first area of the gauge;

display the information about the current fuel efficiency on a second area of the gauge; and display information about a total fuel consumption ratio, which represents a ratio of the amount of fuel consumed by the current fuel efficiency to the amount of fuel consumed by the reference fuel efficiency for a predetermined time, on a third area of the gauge.

4. The system of claim 1, wherein the personal terminal includes at least one of a PC and a portable terminal, and wherein the fuel efficiency learning information is provided to at least one of the PC and the portable terminal through a web page.

5. The system of claim 1, wherein the server is configured to calculate the information about the reference fuel efficiency based on current fuel efficiency of best fuel efficiency equipment by comparing the information about the current fuel efficiency provided from a plurality of construction machinery.

* * * * *